United States Patent [19]

Kampf

[11] 4,242,582
[45] Dec. 30, 1980

[54] MEANS FOR EXPELLING SAMPLE CARRIERS FROM A RADIATION MEASURING APPARATUS

[75] Inventor: Richard S. Kampf, Costa Mesa, Calif.

[73] Assignee: Beckman Instruments, Inc., Fullerton, Calif.

[21] Appl. No.: 55,254

[22] Filed: Jul. 6, 1979

[51] Int. Cl.³ .............................................. G01T 1/00
[52] U.S. Cl. ................................................... 250/328
[58] Field of Search ................ 250/328, 364; 414/223, 414/222

[56] References Cited
U.S. PATENT DOCUMENTS 4,035,642  7/1977  Johnson et al. ...................... 250/328

Primary Examiner—Alfred E. Smith
Assistant Examiner—Carolyn E. Fields
Attorney, Agent, or Firm—R. J. Steinmeyer; Robert R. Meads; Paul Davis

[57] ABSTRACT

Improved means for expelling sample carriers which have been automatically elevated to the sample measuring chamber of a radiation measuring apparatus, from the measuring chamber. The means are collapsible within the instrument housing, as to remain therein as a sample carrier is elevated toward the measuring chamber. Additionally, the means comprise a disposable contamination member which can be removed and discarded in the event of contamination.

11 Claims, 3 Drawing Figures

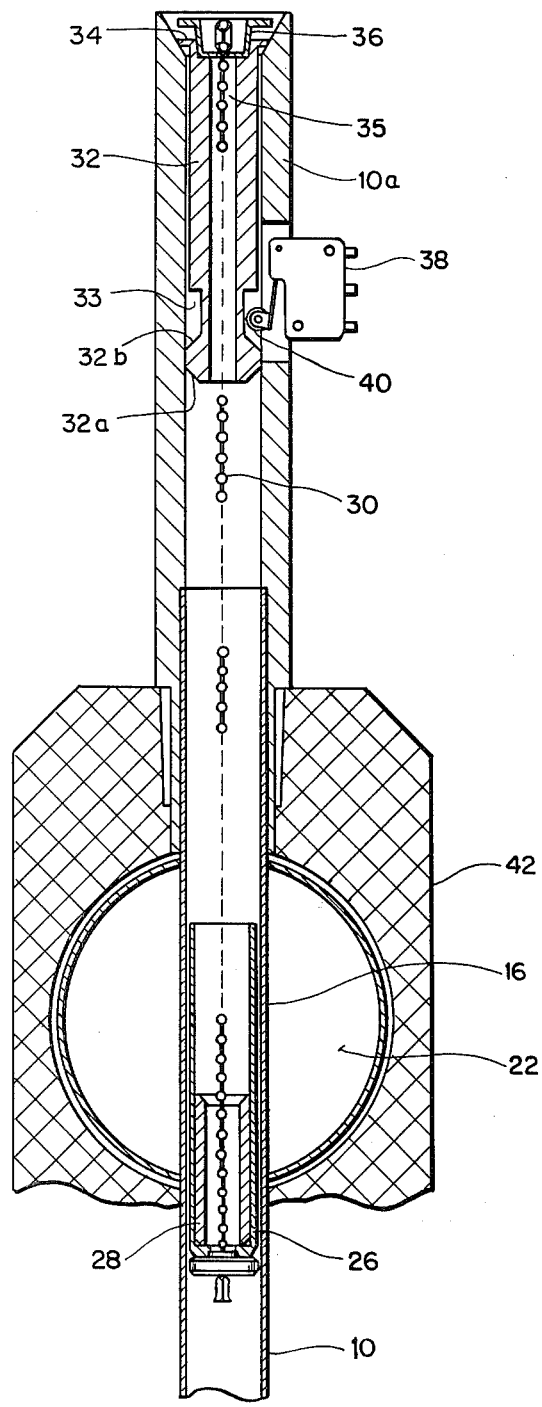
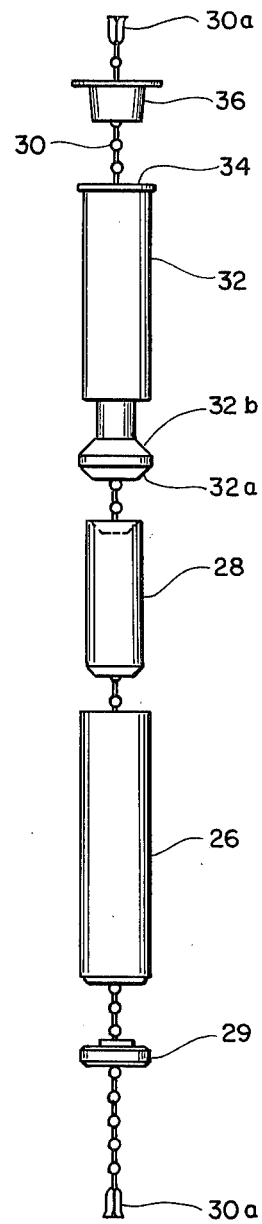
FIG. 2
FIG. 3

MEANS FOR EXPELLING SAMPLE CARRIERS FROM A RADIATION MEASURING APPARATUS

BACKGROUND OF THE INVENTION

The instant invention pertains to sample carrier handling devices, and more particularly, to radiation measuring apparatus using means for mechanically lifting sample carriers from a sample carrier holder to a measuring chamber.

Typically with mechanically operated lifting systems, an elevating rod engages the bottom of the sample carrier in a sample carrier holder, and drives the carrier upward through a vertical tube member into a measuring chamber. When analysis is complete, the elevating rod descends in a direction away from the measuring chamber. Such a system is illustrated in U.S. Pat. No. 3,859,528 (Luitwieler, Jr. et al.). In theory, after the elevating rod ceases to support the sample carrier in a measuring chamber, gravitational force of the sample carrier itself should cause it to descend from the measuring chamber and return to the carrier holder. Because of small clearances between the sample carrier and the vertical tube member, slight irregularities in the shape of the tube member, and static electricity, a sample carrier may remain in its elevated position. When this occurs, a second sample carrier may be elevated beneath the first, causing a malfunction of the instrument. Moreover, malfunctions occur when the gravitational force of the sample carrier is not sufficient to dispel the carrier, resulting in the sample carrier jamming in the vertical tube during its return to the carrier holder.

A solution to this problem is to provide some kind of means to help expel the sample carrier from the vertical tube. U.S. Pat. No. 4,035,642 (Johnson, Jr., et al.) provides such a means, as described in column 3, line 14. "Likewise, to prevent sample carriers from hanging up in the sample zones and to aid in their expulsion, each sample receiving zone is provided with the rods shown in FIG. 1. Holes 33 and 34 are formed in the radiation shield, and alignment with the sample receiving zones 18 and 19. Rods 35 and 36 of suitable length extend through these holes, each rod having a stop 37 and 38 attached to the end of that portion of the rod extending through the radiation shield." Continuing on line 28: "A sample carrier lifted into the sample receiving zone pushes the movable rod vertically up within the zone, while when the sample carrier is being lowered out of the zone, the rod exerts a force down on the carrier, helping to expel it from the zone, the stop limiting the downward motion of the rod within the sample receiving zone."

A significant limitation of sample carrier expulsion means of this type, however, is that the rods extend in a vertical direction beyond the instrument housing. Because the rods extend vertically out of the instrument, placement of the instrument in enclosed confined areas is limited.

An ever present problem with radiation measuring apparatus is contamination. Sample carriers containing a radioactive sample may become contaminated on their external surfaces, and may thus contaminate rods 35 and 36 of Johnson, Jr. et al. upon contact. In this event the rods must be removed from the apparatus and be replaced in entirety, or be decontaminated. This is a result of the rod being one integral unit. It would be desirable to provide means for aiding the expulsion of sample carriers which upon contamination would not have to be decontaminated or replaced in entirety.

SUMMARY

The present invention provides means for aiding the expulsion of a sample carrier from the guiding member of a sample carrier handling device. The means is collapsible within the guiding member, so that it does not extend beyond the apparatus housing. With the instant invention sample carriers are used for containing a sample of material. Elevating means elevates a sample carrier through an access port of a substantially vertical guiding member. The carrier is elevated to a measuring chamber of the guiding member where a measurement of the sample's radioactivity takes place. Subsequent to measurement, the elevating means descends in a vertical direction away from the measuring chamber. A weighted member is supported in position in the guiding member so that as the elevating means makes its descent, the gravitational force of the weighted member acts on the sample carrier to aid its expulsion from the guiding member. A supporting member is provided for supporting the weighted member when the weighted member is in a lowered position. The supporting member is collapsible inside the guiding means and remains therein as the sample carrier is elevated by the elevating means toward the measuring chamber. A contamination protection member is provided for contact with the sample carrier. In the event the exterior of the sample carrier is contaminated, the subsequent contamination of the protection member, the protection member can be easily removed, discarded and replaced.

BRIEF DESCRIPTION OF THE DRAWINGS

FIG. 2 is a close-up view of the means for aiding the expulsion of a sample carrier shown in FIG. 1.

FIG. 3 illustrates one embodiment of the means for aiding expulsion of a sample carrier and the camming and supporting means.

DESCRIPTION OF THE PREFERRED EMBODIMENT

Figure 1:
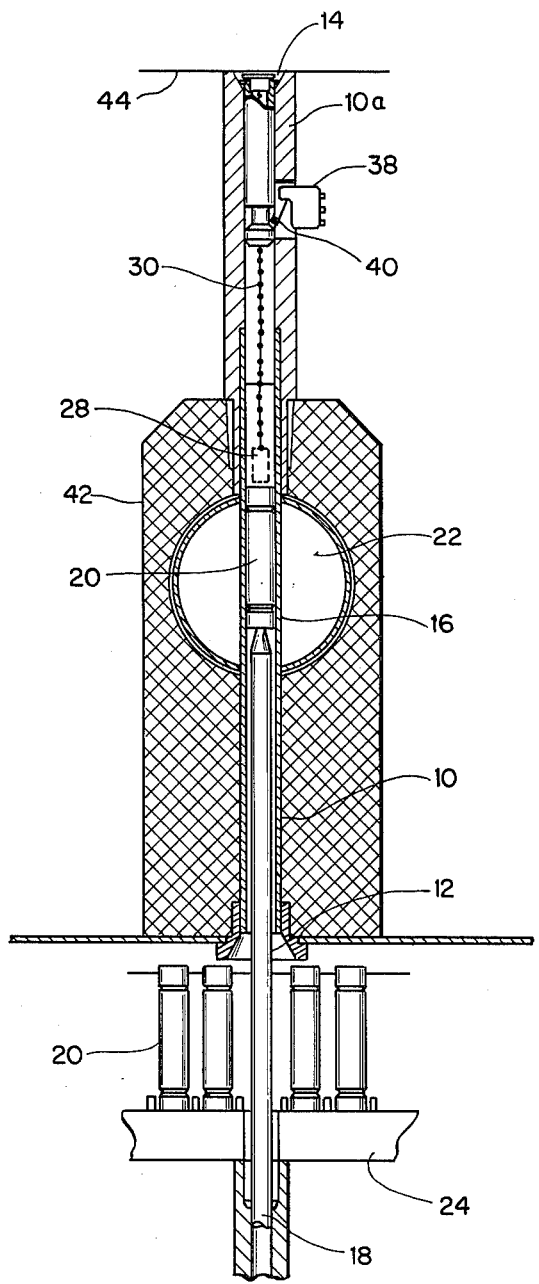
FIG. 1 is a fragmentary sectional view, taken in a generally vertical plane, of a sample handling apparatus of the type having means for mechanically horizontally indexing into position sample carriers, lifting sample carriers to a measuring chamber, and further illustrates one sample carrier raised into the measuring chamber.

Referring now to the drawings, FIG. 1 illustrates a portion of a sample carrier handling apparatus of the type having means for mechanically lifting sample carriers to a measuring chamber, for measurement of radioactivity. The apparatus is particularly suitable for the measurement of gamma emissions but may also be utilized for the measurement of lower energy radiation. Common instruments of this type include gamma counters, liquid scintillation counters, and the like.

A plurality of sample carriers 20, e.g., sample vials, are supported in a sample carrier holder 24. The bottom of holder 24 is provided with apertures, positioned over conventional means 18 for elevating a sample carrier 20 to the measuring chamber 16 of the apparatus. Guiding member 10 comprises a first access port 12 through which a sample carrier 20 may be loaded, a second access port 14 in which a sample carrier 20 can be manually loaded, and a measuring chamber 16 positioned between access ports 12 and 14. An elevating rod 18 is adapted to move upwardly through an aperture in holder 24 and elevate the sample carrier 20 found therein through first access port 12 to guiding member 10 and measuring chamber 16. Elevating rod 18 is comprised essentially of a stainless steel material, with the top end portion of the rod being filled with a shielding material such as lead.

Elevating rod 18 is normally in a lower position beneath carrier holder 24. As illustrated in FIG. 1, elevating rod 18 is in a raised position, extending vertically upward through guiding member 10 and supporting a sample carrier 20 in the measuring chamber 16. Subsequent to sample measurement, elevating rod 18 descends to its lower position, the sample carrier 20 returns to holder 24, and sample carrier holder 24 horizontally indexes so that the next sample carrier is in a position ready to be elevated to measuring chamber 16. The specific details of operation of the elevating means are more fully explained in U.S. Pat. No. 3,859,528 (Luitweiler et al., issued Jan. 7, 1975).

Guiding member 10 is essentially a tubular element which guides the vertical ascent and descent of sample carrier 20 between carrier holder 24 and measuring chamber 16 through first access port 12, when mechanical loading of a sample is desired. Sample carriers may also be manually loaded through the second access port 14. The mechanism by which a sample carrier is manually loaded is conventional and more fully explained in the Luitweiler Jr., et al. patent. Access ports 12 and 14 may be flared as illustrated in FIG. 1 so as to further guide the ascent and descent of carriers 20 to and from the guiding member 10. Guiding member 10 is comprised of a substance which permits the passage of energy emanating from the sample. For this purpose, a phenolic material has been found to be useful. Extending in a generally vertical direction from measuring chamber 16 to instrument housing 44 is an additional guiding member 10a. Guiding member 10a may be integral with guiding member 10, or it may be a separate element coupled to guiding member 10. Guiding member 10a is preferably, for cost purposes, not made of a phenolic substance, but rather is compared of a material less costly, e.g., aluminum. Essentially, however, the only portion of guiding member 10 which need be formed from a material which provides a minimum of gamma radiation attenuation, such as a phenolic substance, is measuring chamber 16.

Substantially surrounding measuring chamber 16 is scintillator crystal 22. Coupled to scintillator crystal 22 is a photomultiplier tube (not shown) for detecting light pulses emanating from scintillator crystal 22 as a result of the radioactivity of the sample being measured. Surrounding scintillator crystal 22 and the photomultiplier tube is a shielding block 42 of lead or other shielding material. Shielding block 42 acts to shield scintillator crystal 22 and the photomultiplier tube from radiation emanating from the background or from samples remaining in holder 24.

While each sample carrier 20 is in measuring chamber 16, it is supported therein by elevating rod 18. Subsequent to measurement of sample radioactivity, elevating rod 18 is caused to descend in a vertical direction away from measuring chamber 16 and return to its normal position beneath carrier holder 24. With nothing to support sample carrier 20 in measuring chamber 16 or guiding member 10, the gravitational force of sample carrier 20 itself causes it to descend therefrom and return to carrier holder 24. However, the gravitational force is not always sufficient, resulting in the sample carrier 20 remaining in measuring chamber 16 or guiding member 10. This constitutes a malfunction and the elevation of a second sample carrier will jam the apparatus.

The instant invention provides means for aiding the expulsion of mechanically loaded sample carriers from measuring chamber 16 and guiding member 10. FIGS. 2 and 3 illustrate the means in detail.

A weighted member 28 is supported in guiding member 10 and positioned above sample carrier 20. Weighted member 28 must have a mass sufficient that its gravitational force will apply a generally vertical downward force on sample carrier 20, causing it to be expelled from measuring chamber 16 and guiding member 10. Weighted member 28 may be comprised of a shielding material such as lead and will then additionally serve as a shield from outside radiation.

Weighted member 28 is supported by a supporting member 30 inside guiding member 10, whenever a sample carrier 20 has been expelled from guiding member 10 and weighted member 28 is in its lowered position. Supporting member 30 is collapsible inside guiding member 10 and remains therein as sample carrier 20 is elevated toward the measuring member 16. Because supporting member 30 is collapsible, or compressible, the means for aiding the expulsion of each sample carrier 20 does not extend beyond instrument housing 44.

Supporting member 30 may be, for example, a chain, as illustrated in FIG. 3, with end links 30a, commonly known as bell links. As shown in FIG. 2, supporting member 30 extends through an aperture of weighted member 28. It is highly desirable that as supporting member 30 becomes compressed, it does not become entangled. For this purpose, a bead chain which will not kink, having end bell links has been found to be very useful.

Before a sample carrier 20 is elevated from carrier holder 24, supporting member 30 fully supports weighted member 28 in guiding member 10, so that supporting member 30 is fully extended when weighted member 28 is in its lowered position, e.g., weighted member 28 is positioned adjacent to first access port 12. As a sample carrier 20 is elevated from carrier holder 24 toward measuring chamber 16, the sample carrier 20 exerts an upward force on weighted member 28 and acts to support weighted member 28. As sample carrier 20 makes its ascent toward measuring chamber 16, supporting member 30 begins to collapse within guiding member 10 and coils around the top portion of sleeve 26 which substantially surrounds weighted member 28. As sample carrier 20 descends away from measuring chamber 16, the gravitational force of weighted member 28 pulls its downward, the supporting member 30 becomes increasingly elongated until it fully supports weighted member 28.

As weighted member 28 moves in a vertical direction in guiding member 10, it comes in sliding contact with the interior wall of guiding member 10 if sleeve 26 is not provided. When lead is used as the material for the weighted member, its sliding contact with guiding member 10 causes a certain amount of lead to rub off and remain on the interior wall of guiding member 10. To alleviate the problem, a sleeve 26 substantially surrounding weighted member 28 is provided. Sleeve 26 preferably is comprised of a polymeric substance which will not rub off on the walls of guiding member 10.

With any type of radiation measuring apparatus, the problem of contamination is encountered. The instant invention provides disposable means for limiting exposure of weighted member 28, sleeve 26, and supporting member 30 to radiation contamination. For this purpose, a contamination protection member 29 is positioned and supported in guiding member 10. Protection member 29 is substantially superposed on the face of sleeve 26 which is nearest the elevating means. Protection member 29 is supported by supporting member 30 and can be readily removed from supporting member 30 and disposed of. The most usual place for contamination to occur is the place where protection member 29 touches the top of a sample carrier. In the event of limited contamination, protection member 29 can be removed and discarded. Thus, for purposes of limited contamination, there is no need to remove and discard the entire means for aiding the expulsion of sample carriers. Protection member 29 is preferably formed from an inexpensive polymeric material, and has an exterior surface which is slightly beveled. The reason for the beveled surface is explained in subsequent paragraphs.

Electrical switching means 38 are provided for causing the sample carrier holder 24 to remain stationary or more horizontally, and for causing elevating rod 18 to remain in a lowered position or sequentially move vertically toward and away from measuring chamber 16. Electrical switching means 38 is supported adjacent to the outside of guiding member 10a and has an arm member 40 which extends through an aperture of guiding member 10a therein. Arm member 40 is of conventional design such as an actuating arm with a roller tip. When arm member 40 is depressed, electrical switching means 38 causes elevating rod 18 and sample carrier holder 24 to cease operating. A sample carrier 20 may be manually loaded through second access port 14, causing arm member 40 to be depressed. With arm member 40 depressed, weighted member 28, and sleeve 26 may be drawn out of guiding member 10a through second access port 14. If means are not provided for camming arm member 40, as weighted member 28 and sleeve 26 are drawn out of guiding member 10a, they can catch on arm member 40. For purposes of allowing removal of weighted member 28 and sleeve 26 therefrom, means are provided for camming arm member 40. When arm member 40 is cammed, weighted member 28 and sleeve 26 can pass through guiding member 10a freely.

The means is comprised of an elongated camming and supporting member 32 positioned in the upper portion of guiding member 10a, and capable of vertical movement therein. A first end of member 32 has a shoulder portion 34 which has a diameter larger than the diameter of the body of member 32 and larger than the diameter of guiding member 10a. Member 32 is positioned with shoulder 34 being nearest to second access port 14. Because the diameter of shoulder 34 is larger than the diameter of guiding member 10a, shoulder 34 rests on the surface of second access port 14, causing member 32 to be supported in guiding member 10a.

The body of member 32 has a recessed area 33. When member 32 is normally positioned in guiding member 10a, arm member 40 extends into recessed area 33. In this position, arm member 40 permits switch 38 to remain in its position. Member 32 not only serves to cam arm member 40, but it also is self supporting in guiding member 10a.

Vertical movement of member 32 within guiding member 10a can cause arm member 40 to catch on member 32 due to the exterior surface of member 32. To alleviate this problem, certain corners of the exterior of member 32 are beveled as to permit arm member 40 to slide along the surface without catching on an abrupt corner. Member 32 is provided with a first beveled edge 32a at its lower end, and a second beveled edge 32b on the edge of recessed area 33 which is nearest to the lower end of member 32. The purpose of the first beveled edge 32a is to permit member 32 to be inserted in guiding member 10a through second access port 14. As member 32 is inserted therein, beveled edge 32a begins to cam arm member 40 until it is fully cammed. When member 32 has traveled a sufficient downward distance in guiding member 10a, arm member 40 enters recessed area 33 and no longer is in a cammed position. Beveled edge 32b is provided for the removal of arm member 40 from recessed area 33 as member 32 moves in a generally upward vertical direction out of guiding member 10a. As member 32 begins its upward ascent, arm member 40 encounters beveled surface 32b and begins to cam. Without beveled edge 32b, arm member 40 would catch on the corner of recessed area 33, creating difficulty in the movement of arm member 40 out of recessed area 33.

Protection member 29 is provided with a beveled surface, as previously mentioned. The beveled surface allows protection member 29 to be inserted through second access port 14 and member 10a. In this way, sleeve 26 can pass by arm member 40 without catching thereon as sleeve 26 is lowered into guiding member 10a.

Member 32 is provided with an opening 35 which extends longitudinally from shoulder 34 to the lower end of member 32. Supporting member 30 extends through opening 35. Means are provided for engaging the upper end of supporting member 30 on shoulder 34. In this way, supporting member 30 is supported by shoulder 34 and will not fall through opening 35. The means may either be a flange 36 having a diameter larger than the diameter of opening 35, or merely a knot in supporting member 30 having a diameter larger than the diameter of opening 35. Thus member 32 serves to support supporting member 30, sleeve 26 and protection member 29, in guiding member 10.

Weighted member 28 is removed from guiding member 12 by pulling flange 36 in a generally vertical upward direction. Supporting member 30 will be pulled vertically up at measuring chamber 16, bringing with it weighted member 28, sleeve 26, and protection member 29. Upward movement of sleeve 26 causes member 32 to move in the same upward direction, causing arm member 40 to be moved laterally, and permitting sleeve 26 to move past arm member 40 without catching thereon.

As is apparent, the specific embodiment described herein may be altered and changed by those skilled in the art without departing from the true spirit and scope of the invention which is defined in the appended claims.

What is claimed is:

1. An improved radiation measuring apparatus of the type having a sample carrier for containing the sample of material to be measured, a substantially vertical guiding member for the sample carrier having a sample measuring chamber, and an elevating means for moving the sample carrier in the guiding member to the measuring chamber, the improvement comprising:
- a weighted member supported in the guiding member, so positioned and having sufficient mass that its gravitational force causes any sample carrier to be expelled from the measuring chamber as the elevating means descends in a direction away from the measuring chamber; and
- a supporting member inside the guiding member supporting the weighted member therein when the weighted member is in its lowered positon, and collapsible inside the guiding member to remain therein as the sample carrier is elevated by the elevating means toward the measuring chamber.

2. The improved radiation measuring apparatus as defined in claim 1, additionally comprising a sleeve member substantially surrounding the weighted member so as to prevent sliding contact of the weighted member with the guiding member and provide a place for the supporting member to coil up in.

3. The improved radiation measuring apparatus as defined in claim 2, additionally comprising a contamination protection member positioned and supported in the guiding member, the supporting member extending through and supporting the contamination protection member in a position substantially superposed on the face of the sleeve nearest the elevating means, the contamination protection member helping to protect the sleeve from radiation contamination.

4. The improved radiation measuring apparatus as defined in claim 1, wherein the weighted member is comprised of a radiation shielding material.

5. The improved radiation measuring apparatus as defined in claim 1, wherein a tension force is applied to the supporting member by the weighted member when the weighted member is in its lowered position.

6. In an improved radiation measuring apparatus of the type having a substantially vertical guiding member having first and second access ports for loading sample carriers in the guiding member, and having a sample measuring chamber positioned between the first and second access ports in the guiding member, and elevating means for moving a sample carrier to the guiding member and the measuring chamber, the improvement comprising:
- a weighted member supported in the guiding member, so positioned and having sufficient mass that its gravitational force causes any sample carrier to be expelled from the measuring chamber as the elevating means descends in the direction away from the measuring chamber;
- electrical switching means supported adjacent to the guiding member and having an arm member extending into the guiding member;
- a supporting and camming member having an opening therethrough and having a shoulder member with a diameter larger than the body of the supporting and camming member so that the shoulder member will catch on the guiding member and position and support the supporting and camming member in the guiding member, the supporting and cammimng member having operative contact with the arm member of the electrical switching means so that the arm member can be depressed and the weighted member removed from the guiding member through the second access port without catching on the arm member;
- a supporting member inside the guiding member, supporting the weighted member therein when the weighted member is in its lower position, the supporting member extending through the opening in the supporting and camming member, and compressible inside the guiding member to remain therein as the sample carrier is elevated by the elevating means toward the measuring chamber; and
- means for catching the supporting member on the shoulder member of the supporting and camming member so that the supporting member is supported thereon.

7. The improved radiation measuring apparatus as defined in claim 6, additionally comprising a sleeve member substantially surrounding the weighted member so as to prevent sliding contact of the weighted member with the guiding member.

8. The improved radiation measuring apparatus as defined in claim 6, additionally comprising a contamination protection member positioned and supported in the guiding member, the supporting member extending through and supporting the contamination protection member in a position substantially superposed on the face of the sleeve nearest the elevating means, the contamination protection member helping to protect the sleeve from radiation contamination.

9. The improved radiation measuring apparatus as defined in claim 6, wherein the weighted member is comprised of a radiation shielding material.

10. The improved radiation measuring apparatus as defined in claim 6, wherein the supporting and camming member has a recessed area where the arm member extends, movement of the supporting and camming member a predetermined distance in the guiding member causes the arm member to become cammed as it moves out of the recess.

11. In apparatus for handling sample carriers containing sample to be measured of the type including a generally vertically extending sample carrier guiding member communicating with a sample measuring chamber, and elevating means for moving the sample carrier in a generally vertical path along the guiding member upwardly toward and downwardly away from the measuring chamber, the improvement comprising:
- a weighted member configured for movement along the vertical path and so positioned to engage a sample carrier in the vertical path and move therewith toward and away from the measuring chamber, the weighted member having a mass which applies a gravitational force to a sample carrier so engaged sufficient to expel the sample carrier from the measuring chamber as the elevating means moves away from the measuring chamber; and
- a supporting member supporting the weighted member in a lowermost position in the vertical path below the measuring chamber, and collapsible therealong as the weighted member is moved toward the measuring chamber.

* * * * *